United States Patent [19]

Katchman

[11] 4,123,474

[45] Oct. 31, 1978

[54] POLYPHENYLENE ETHER RESIN COMPOSITIONS CONTAINING A DIPHENYLAMINE

[75] Inventor: Arthur Katchman, Delmar, N.Y.

[73] Assignee: General Electric Company, Pittsfield, Mass.

[21] Appl. No.: 638,803

[22] Filed: Dec. 8, 1975

[51] Int. Cl.$^2$ .................. C08L 25/06; C08L 71/04
[52] U.S. Cl. ........................... 260/874; 260/45.7 S; 260/45.9 R; 260/876 R; 526/2; 526/3; 526/6
[58] Field of Search .......... 260/874, 45.9 R, 45.9 NP, 260/45.7 S, 876 R

[56] References Cited

U.S. PATENT DOCUMENTS

| | | | |
|---|---|---|---|
| 2,009,480 | 7/1935 | Craig | 18/50 |
| 3,383,435 | 5/1968 | Cizek | 260/874 |
| 3,663,654 | 5/1972 | Haaf | 260/874 |
| 3,700,750 | 10/1972 | Yamanouchi et al. | 260/874 |
| 3,792,121 | 2/1974 | Abolins et al. | 260/874 |
| 3,887,646 | 6/1975 | Yonemitsu et al. | 260/876 R |
| 3,987,004 | 10/1976 | Gergoudis | 260/45.8 A |

*Primary Examiner*—Wilbert J. Briggs, Sr.
*Attorney, Agent, or Firm*—Morgan, Finnegan, Pine, Foley & Lee

[57] ABSTRACT

Novel stabilized compositions of a polyphenylene ether and an alkenyl aromatic resin are disclosed which include a minor amount of a diphenylamine.

18 Claims, No Drawings

POLYPHENYLENE ETHER RESIN COMPOSITIONS CONTAINING A DIPHENYLAMINE

The present invention provides novel stabilized compositions of a polyphenylene ether and a vinyl aromatic resin that include a minor amount of a diphenylamine.

BACKGROUND OF THE INVENTION

The term "polyphenylene ether resin" includes a family of polymers that are well known to those skilled in the art. These polymers are made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst.

Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al, U.S. Pat. Nos. 3,337,499; Blanchard et al, 3,219,626; Laakso et al, 3,342,892; Borman, 3,344,166; Hori et al, 3,384,619; Faurote et al, 3,440,217; and disclosures relating to metal based catalysts which do not include amines, are known from U.S. Pat. Nos. such as Weiden et al, 3,442,885 (copperamidines); Nakashio et al, 3,573,257 (metal-alcoholate or -phenolate); Kobayashi et al, 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al, U.S. Pat. No. 3,382,212. Cizek, U.S. Pat. No. 3,383,435 discloses polyphenylene ether styrene resin compositions. Katchman, U.S. Pat. No. 3,663,661 also discloses polyphenylene ether resin compositions. All of the above-mentioned disclosures are incorporated herein by reference.

Compositions of polyphenylene ethers are known to exhibit inferior thermal properties after exposure to thermal stress for prolonged periods. This form of degradation causes molded articles to become brittle and fail when they are subjected to stress. This has resulted in a need for stabilizers that prevent embrittlement of polyphenylene ether resin compositions when said composition are used in high temperature applications. Applicant has now discovered that diphenylamines may be employed to provide stabilized compositions of polyphenylene ether resins without any evidence of incompatibility. This stabilization is accomplished without discoloration of the polyphenylene ether resin which is an important consideration for white or pastel colored articles. The diphenylamines have been employed in the stabilization of rubber, polyamides, polyacetals, polyethylene, polypropylene, ethylene-propylene copolymers and terpolymers, ABS and synthetic lubricants. These materials are processed at much lower temperatures than the polyphenylene ether resins and it is surprising that the diphenylamines, at low concentrations, are effective to stabilize polyphenylene ether resin compositions which are processed at relatively high temperatures, i.e., 580° F.

Accordingly, it is a primary object of this invention to provide polyphenylene ether resin compositions that have improved resistance to thermal aging.

It is also an object of this invention to provide a new method for imparting thermal stability to a polyphenylene ether resin composition.

DESCRIPTION OF THE INVENTION

The present invention provides a thermoplastic molding composition having improved resistance to thermal aging which comprises: resin in combination with an alkenyl aromatic resin;

(b) a stabilizing amount of a diphenylamine of the formula:

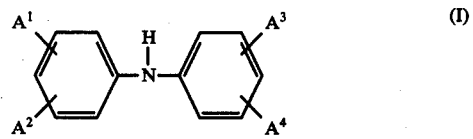

wherein $A^1$, $A^2$, $A^3$ and $A^4$ are independently selected from the group consisting of hydrogen, halogen, hydrocarbon radicals, halohydrocarbon radicals, hydrocarbonoxy radicals and halohydrocarbonoxy radicals and mixtures thereof.

The preferred polyphenylene ether resin is poly(2,6-dimethyl-1,4-phenylene ether) selected from the group consisting of hydrogen, alkyl of 1–15 carbon atoms, alkoxy of from 1–15 carbon atoms and mixtures of said diphenylamines.

The polyphenylene ether resins are preferably of the formula:

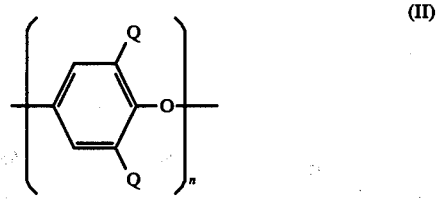

wherein n is a positive integer of at least 50, the oxygen ether atom of one unit is connected to the benzene nucleus of the next adjoining unit and each Q is a monovalent substituent selected from the group consisting of hydrogen, halogen, hydrocarbon radicals free of a tertiary alpha carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

The alkenyl aromatic resin should have at least 25% of its units derived from a compound of the formula:

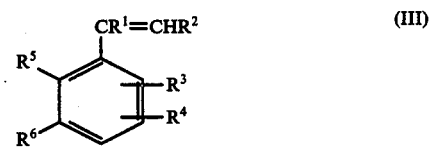

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

Materials that may be copolymerized with the vinyl aromatic monomer include those having the general formula:

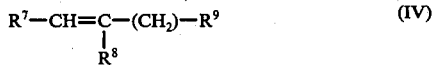

(IV)

wherein $R^7$ and $R^8$ represent a substituent selected from the group consisting of hydrogen, halogen, an alkyl group of 1–4 carbon atoms, carboalkoxy having from 1–4 carbon atoms or $R^7$ and $R^8$ taken together represent an anhydride linkage (—COOOC—) and $R^9$ is hydrogen, vinyl and alkyl or alkenyl group having 1–12 carbon atoms, cycloalkyl having 3–6 carbon atoms, carboalkoxy having 2 to 6 carbon atoms, alkoxy-alkyl having 2 to 6 carbon atoms, alkylcarboxy having 2 to 6 carbon atoms, ketoxy, halogen, carboxy having 1 to 6 carbon atoms, cyano or pyridyl and $n$ is a whole number between 0 and 9.

The general formulas set forth above include by way of example, homopolymers such as homopolystyrene and monochloropolystyrene, the modified polystyrenes, such as rubber-modified, high-impact polystyrene and the styrene containing copolymers, such as the styrene acrylonitrile copolymers, styrene butadiene copolymers, styrene-acrylonitrile-α-alkyl styrene copolymers, styrene-acrylonitrile-butadiene copolymers, poly-α-methylstyrene, copolymers of ethylvinylbenzene, divinylbenzene and styrene maleic anhydride copolymers and block copolymers of styrene-butadiene and styrene-butadiene-styrene.

The styrene-maleic anhydride copolymers are described in U.S. Pat. Nos. 2,971,939; 3,336,267 and 2,769,804 which are hereby incorporated by reference.

The rubber-modified, high-impact styrene resins are preferred and these may be made by well known procedures with rubbers such as nitrile rubbers, polybutadiene rubber, styrenebutadiene rubber, polysulfide rubber, ethylene-propylene copolymers, propylene oxide and EPDM. A useful rubber modified, high impact rubber modified polystyrene is Foster Grant 834 which contains about 9–10% polybutadiene by weight.

The diphenylamines are preferably of the formula:

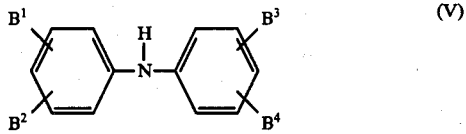

(V)

wherein $B^1$, $B^2$, $B^3$ and $B^4$ are independently selected from the group consisting of hydrogen and lower alkyl of 1 to 10 carbon atoms and mixtures of said diphenylamines.

Examples of useful diphenylamines within the scope of formula V include, but are not limited to, p-ethyl diphenylamine, m-ethyl diphenylamine, o-ethyl diphenylamine, p-isopropyl diphenylamine, o-isopropyl diphenylamine, n-propyl diphenylamine, n-butyl diphenylamine, secondary butyl diphenylamine, isobutyl diphenylamine, tertiary butyl diphenylamine, the amyl, hexyl, heptyl, octyl, nonyl, decyl and other alkyl substituted diphenylamines; dialkyl substituted diphenylamines such as 2-methyl-5-isopropyl diphenylamine, p-isopropyl p'-methyl diphenylamine, ethyl phenyl p-toluidine, ethyl-phenyl xylidine, butyl-phenyl p-toluidine, heptyl-phenyl p-toluidine, cyclohexylphenyl p-toluidine, p,p'-di-isopropyl diphenylamine, 2,2'-dimethyl-5,5'-di-isopropyl diphenylamine, 2,2'-di-isopropyl-5,5'-dimethyl diphenylamine, p,p'-di-tertiary butyl diphenylamine, p,p'-di-tertiary amyl diphenylamine, etc. Many of these compounds are disclosed in U.S. Pat. No. 2,009,480 which is hereby incorporated by reference. These materials are commercially available and suitable products include Naugard 445 and Wytox ADP.

An inorganic sulfide may also be added to the stabilized compositions of the invention.

The particular inorganic sulfide that may be used in combination with the diphenylamine is not critical, representative examples of suitable sulfides including sodium sulfide, potassium sulfide, calcium sulfide, barium sulfide, zirconium sulfide, titanium sulfide, nickel sulfide, manganese sulfide, iron sulfide, cobalt sulfide, chromium sulfide, copper sulfide, zinc sulfide, cadmium sulfide, mercurous and mercuric sulfides, tin sulfide, lead sulfide, and the like. Most preferred sulfides are those of zinc and cadmium. The amount of sulfide added to the polyphenylene ether formulation is not critical, small amounts providing some improvement and larger amounts providing greater improvement. Preferably, the sulfide in the formulation comprises at least 0.1 parts by weight and most preferably, from 0.1 to 6.0 parts by weight of the total formulation.

In addition to the inorganic sulfide, an organic phosphite may be included in the stabilizer formulation. Phosphites contemplated by the invention include those compounds of the formula:

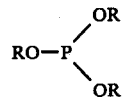

wherein R is independently selected from the group consisting of hydrogen and substituted and unsubstituted hydrocarbon groups containing up to about 20 carbon atoms including saturated and unsaturated, straight, branched chain and mono-cyclic and polycyclic groups. Suitable examples of these compounds are those wherein R is hydrogen, straight or branched chain alkyl of from 1–20 carbon atoms, alkenyl of from 1–20 carbon atoms, (lower)-alkylphenyl, phenyl, halo alkyl of from 1–20 carbon atoms, and substituted phenyl wherein the substituents may include one or more halogen, hydroxy or (lower)alkyl groups of 1–10 carbon atoms. Suitable examples include the following: phenylneopentyl phosphite, phenylethylene hydrogen phosphite, triethylene phosphite, dichloroethyl phosphite, tributyl phosphite, trilauryl phosphite, bis(2-ethylhexyl) hydrogen phosphite, phenyl bis(3,5,5'-trimethylhexyl)-phosphite, mixed 2-ethylhexyloctyl phenyl phosphite, cis-9-octadecenyl diphenyl phosphite, 2-ethyl-hexyl di(p-tolyl)phosphite, allyl phenyl hydrogen phosphite, bis(2-ethylhexyl)p-tolyl phosphite, triadecyl phosphite, bis(2-ethylhexyl)phenyl phosphite, triallyl phosphite, triisooctyl phosphorotrithioite, tributyl phosphorotrithioite, trimethallyl phosphite, tri(nonylphenyl)phosphite, phenyl methyl hydrogen phosphite, bis(p-tert-butyl phenyl)octadecyl phosphite, triamyl phosphite, (p-tert-butylphenyl)di(octadecyl)phosphite, diisopropyl hydrogen phosphite, p-cymyl dioctyl phosphite, dipropyl hydrogen phosphite, di(dodecyl)p-tolyl phosphite, triisooctyl phosphite, decyl bis(p-1,1,3,3-tetramethylbutylphenyl) phosphite, trimethyl phosphite, nonyl bis(p-1,1,3,3-tetramethylbutylphenyl) phosphite, diallyl hydrogen phosphite, diisodecyl p-tolyl phosphite, tricresyl phosphite, diisodecyl phenyl phosphite, triphenyl phosphite, octyl bis(3,5,5-trimethylhexyl) phosphite, dibutyl phenyl phosphite, di-p-tolyl 3,4,5-trimethylhexyl phosphite, 2-chloroethyl diphenyl phosphite, p-tolyl bis(2,5,5-trimethylhexyl) phosphite, diphenyl decyl phosphite, 2-ethylhexyl diphenyl phosphite, tris(2-ethylhexyl) phosphite, tri(octadecyl)phosphite, trioctyl phosphite, tris(2-chloroisopropyl) phosphite, dibutyl hydrogen phosphite, di(dodecyl) hydrogen phosphite, phenyl dodecyl phosphite, di(tridecyl)hydrogen phosphite, and diphenyl hydrogen phosphite. The permissible concentration range for the phosphite is about the same as that for the sulfide and diphenylamine, but where the three are used in combination, the lower limits of the range are preferred such as for example, between about 0.1 to 2.0 parts for each of the stabilizers in the combination.

Under aqueous acidic conditions the sulfide stabilized compositions of the invention may produce byproducts as a result of decomposition. This may be controlled by the use of an inorganic oxide such as zinc oxide, magnesium oxide, cadmium oxide, barium oxide, calcium oxide, titanium dioxide, zirconium oxide, mercuric oxide and lead oxide. Generally the amount of oxide employed in the formulation will preferably comprise about 0.1–1.0 parts by weight although the suitable range is about 0.05 parts to about 6 parts by weight.

The compositions of the invention may include from 10 to 90 parts by weight of the polyphenylene ether resin and preferably from 60 to 40 parts by weight of this component; the alkenyl aromatic resin may comprise from 90 to 10 parts by weight of the composition and more preferably from 40 to 60 parts by weight; the diphenylamine component may comprise from 0.25 to 10 parts by weight of the composition and more preferably from 1 to 5 parts by weight.

The composition may also include other additives, processing aids, fillers, reinforcements, flame retardants, etc.

Reinforcing fillers such as aluminum, iron or nickel, and the like and non-metals, such as carbon filaments, silicates, such as acicular calcium silicate, asbestos, titanium dioxide, potassium titanate and titanate whiskers, glass flakes and fibers may be used. It is also to be understood that, unless the filler adds to the strength and stiffness of the composition it is only a filler and not a reinforcing filler.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important e.g., the low soda glass known as "C" glass. The filaments are made by standard processes, e.g., by steam or air blowing, flame blowing and mechanical pulling. The preferred filaments for plastics reinforcement are made by mechanical pulling.

If a reinforcing filler is used, a reinforcing amount within the range of 1–80% by weight, preferably 10–40% by weight may be employed.

Flame retardants may also be included in the composition such as those disclosed in U.S. Pat. No. 3,671,487 which is hereby incorporated by reference.

Triarylphosphates such as triphenylphosphate may be added as a flame retardant for the composition in amounts of 2–10% by weight.

DESCRIPTION OF THE PREFERRED EMBODIMENTS

The following test specimens were prepared by blending the components in a Henschel blender and extrusion in a W. P. 28 mm twin screw extruder at a stock temperature of 580° F. The strands were chopped into pellets and the pellets were molded into test specimens using a Newbury molding machine. Tensile specimens were aged in a forced air oven at 125° C. Tensile elongation was measured on an Instron testing machine and failure was recorded when the specimens exhibited a brittle break.

|  | Example 1 | Example 2 | Control A |
|---|---|---|---|
| poly(2,6-dimethyl-1,4-phenylene ether) (PPO General Electric Co. IV of about 0.5 in CHCl₃ at 30° C) | 500 | 500 | 500 |
| high impact, rubber modified polystyrene (Foster Grant 834) | 500 | 500 | 500 |
| triphenylphosphate | 30 | 30 | 30 |
| tridecylphosphite | 10 | 10 | 10 |
| zinc sulfide | 10 | 10 | 10 |
| zinc oxide | 10 | 10 | 10 |
| titanium dioxide | 10 | 10 | 10 |
| polyethylene (Microthene M-710) | 15 | 15 | 15 |
| Wytox ADP* | — | 10 | — |
| Naugard 445* | 10 | — | — |

*a 50–50 (aprox) mixture of mono-nonyl diphenyl amine and di-nonyl diphenylamine from National Polychemicals
**an alkylated diphenylamine from Uniroyal The thermal aging test results in days to embrittlement at 125° C. were as follows:

| Example 1 | Example 2 | Control A |
|---|---|---|
| 35 | 31 | 17 |

These test results demonstrate the effectiveness of the stabilizer of the present invention.

The following composition was prepared and tested to demonstrate the effect of deleting zinc sulfide and tridecylphosphite:

|  | Control R |
|---|---|
| poly(2,6-dimethyl-1,4-phenylene ether) PPO General Electric Co. IV of about 0.5 in CHCl₃ at 30° C | 500 |
| high impact, rubber modified polystyrene (Foster Grant 834) | 500 |
| triphenylphosphate | 30 |
| zinc oxide | 10 |
| titanium oxide | 10 |
| polyethylene (Microthene M-710) | 15 |

The thermal aging test results in days to embrittlement at 125° C. were as follows:

Control B
7

EXAMPLE 3

Using procedures analogous to Example 1, stabilized compositions are prepared using the following substituted diphenylamines as stabilizers:

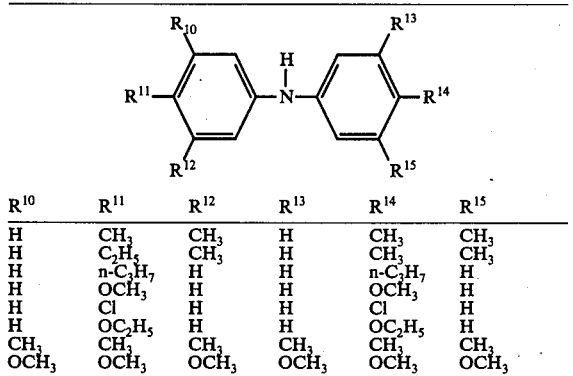

| $R^{10}$ | $R^{11}$ | $R^{12}$ | $R^{13}$ | $R^{14}$ | $R^{15}$ |
|---|---|---|---|---|---|
| H | $CH_3$ | $CH_3$ | H | $CH_3$ | $CH_3$ |
| H | $C_2H_5$ | $CH_3$ | H | $CH_3$ | $CH_3$ |
| H | n-$C_3H_7$ | H | H | n-$C_3H_7$ | H |
| H | $OCH_3$ | H | H | $OCH_3$ | H |
| H | Cl | H | H | Cl | H |
| H | $OC_2H_5$ | H | H | $OC_2H_5$ | H |
| $CH_3$ | $CH_3$ | $CH_3$ | $CH_3$ | $CH_3$ | $CH_3$ |
| $OCH_3$ | $OCH_3$ | $OCH_3$ | $OCH_3$ | $OCH_3$ | $OCH_3$ |

Obviously, other modifications and variations of the present invention are possible in the light of the above teachings. It is, therefore, to be understood that changes may be made in the particular embodiments of the invention described which are within the full intended scope of the invention as defined by the appended claims.

I claim:
1. A stabilized thermoplastic molding composition which consists essentially of:
   (a) a polyphenylene ether resin or a polyphenylene ether resin in combination with an alkenyl aromatic resin;
   (b) a stabilizing amount of a diphenylamine of the formula:

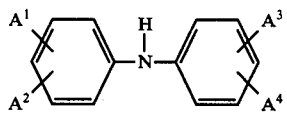

wherein $A^1$, $A^2$, $A^3$ and $A^4$ are independently selected from the group consisting of hydrogen, halogen, hydrocarbon radicals, halohydrocarbon radicals, hydrocarbonoxy radicals, halohydrocarbonoxy radicals and mixtures of said diphenylamines.

2. A composition as defined in claim 1 wherein said polyphenylene ether resin is of the formula:

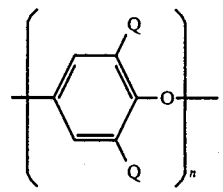

wherein n is a positive integer of at least 50, the oxygen ether atom of one unit is connected to the benzene nucleus of the next adjoining unit and each Q is a monovalent substituent selected from the group consisting of hydrogen, halogen, hydrocarbon radicals free of a tertiary alpha carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

3. A composition as defined in claim 2 wherein the alkenyl aromatic resin has at least 25% of its units derived from a compound of the formula:

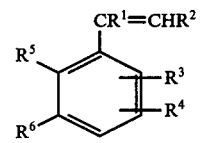

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ may be concatenated together with hydrocarbyl groups to form a naphthyl group.

4. The stabilized composition of claim 3 wherein said alkenyl aromatic resin is a rubber modified, high impact polystyrene.

5. The stabilized composition of claim 4 wherein the polyphenylene ether resin is poly(2,6-dimethyl-1,4-phenylene ether).

6. A stabilized thermoplastic molding composition which consists essentially of:
   (a) poly(2,6-dimethyl-1,4-phenylene ether);
   (b) a rubber modified, high impact styrene resin;
   (c) a stabilizing amount of a diphenylamine of the formula:

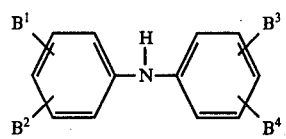

wherein $B^1$, $B^2$, $B^3$ and $B^4$ are independently selected from the group consisting of hydrogen and lower alkyl of 1 to 10 carbon atoms, and mixtures of said diphenylamines.

7. The stabilized composition of claim 6 which includes from 10 to 90 parts by weight of the polyphenylene ether resin; from 90 to 10 parts by weight of the rubber modified high impact polystyrene resin; and from 0.25 to 10 parts by weight of a diphenylamine.

8. The stabilized composition of claim 7 wherein the diphenyl amine is a mixture of mono and di-nonyl-diphenyl amines.

9. The stabilized composition of claim 1 which includes a reinforcing amount of a reinforcing filler.

10. The stabilized composition of claim 1 which includes a flame retardant amount of a flame retardant.

11. The stabilized composition of claim 9 which includes a reinforcing amount of a reinforcing filler.

12. A stabilized thermoplastic molding composition which comprises:
   (a) a polyphenylene ether resin of the formula:

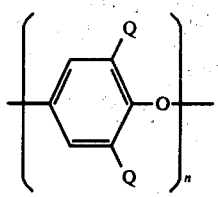

wherein n is a positive integer of at least 50, the oxygen ether atom of one unit is connected to the benzene nucleus of the next adjoining unit and each Q is a monovalent substituent selected from the group consisting of hydrogen, halogen, hydrocarbon radicals free of a tertiary carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus;

(b) an alkyl aromatic resin that has at least 25% of its units derived from a compound of the formula:

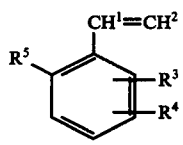

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons of $R^5$ and $R^6$ may be concatenated together with hydrocarbyl groups to form a naphthyl group;

(c) and from 0.25–10 parts by weight of a diphenylamine of the formula

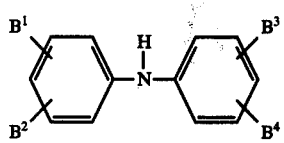

wherein $B^1$, $B^2$, $B^3$ and $B^4$ are independently selected from the group consisting of hydrogen and lower alkyl of 1 to 10 carbon atoms and mixtures of said diphenylamines; and (d) an inorganic sulfide.

13. A composition as defined in claim 12 having the formulation
(a) from 10–90 parts by weight of poly(2,6-dimethyl-1,4-phenylene ether resin;
(b) from 90–10 parts by weight of high-impact rubber-modified polystyrene;
(c) from 0.25–10 parts by weight of an diphenylamine that is alkylated with alkyl groups of from 1–10 carbon atoms; and
(d) from 0.1 to 0.6 parts by weight of an inorganic sulfide.

14. The stabilized composition of claim 12 wherein the inorganic sulfide is zinc sulfide.

15. A stabilized thermoplastic molding composition which comprises:
(a) a polyphenylene ether resin of the formula:

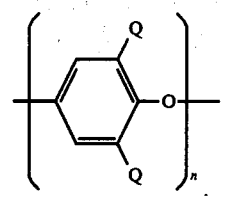

wherein n is a positive integer of at least 50, the oxygen ether atom of one unit is connected to the benzene nucleus of the next adjoining unit and each Q is a monovalent substituent selected from the group consisting of hydrogen, halogen, hydrocarbon radicals free of a tertiary carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nuclues;

(b) an alkenyl aromatic resin that has at least 25% of its units derived from a compound of the formula:

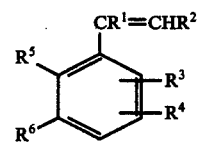

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group;

(c) from 0.25 to 10 parts by weight of a diphenylamine of the formula:

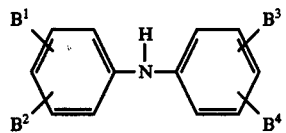

wherein $B^1$, $B^2$, $B^3$ and $B^4$ are independently selected from the group consisting of hydrogen and lower alkyl of 1 to 10 carbon atoms and mixtures of said diphenylamines; and (d) a phosphite of the formula:

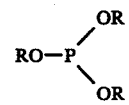

wherein R is independently selected from the group consisting of hydrogen, straight or branched chain alkyl of from 1-20 carbon atoms, alkenyl of from 1-20 carbon atoms, (lower) alkylphenyl, phenyl, haloalkyl of from 1-20 carbon atoms and substituted phenyl wherein the substituents may include one or more halogen, hydroxy or (lower) alkyl groups of 1–10 carbon atoms.

16. The stabilized composition of claim 15 wherein the phosphite is tridecyl phosphite.

17. The stabilized composition of claim 15 which also includes an inorganic sulfide.

18. The stabilized composition of claim 17 wherein the phosphite is tridecyl phosphite and the inorganic sulfide is zinc sulfide.

* * * * *

UNITED STATES PATENT AND TRADEMARK OFFICE
CERTIFICATE OF CORRECTION

PATENT NO. : 4,123,474
DATED : October 31, 1978
INVENTOR(S) : Arthur Katchman

It is certified that error appears in the above-identified patent and that said Letters Patent are hereby corrected as shown below:

In Column 1, line 55, "composition" should be --compositions--.

In Column 2, line 14, after "comprises:" insert the following:

-- (a) a polyphenylene ether resin or a polyphenylene ether--.

Signed and Sealed this

Twenty-fourth Day of April 1979

[SEAL]

Attest:

RUTH C. MASON
Attesting Officer

DONALD W. BANNER
Commissioner of Patents and Trademarks